(12) United States Patent
Abedini et al.

(10) Patent No.: US 10,609,661 B2
(45) Date of Patent: Mar. 31, 2020

(54) TIMING INDICATION THROUGH DMRS/PBCH IN DIFFERENT MODES

(71) Applicant: QUALCOMM Incorporated, San Diego, CA (US)

(72) Inventors: Navid Abedini, Raritan, NJ (US); Muhammad Nazmul Islam, Edison, NJ (US); Sundar Subramanian, San Diego, CA (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/968,598

(22) Filed: May 1, 2018

(65) Prior Publication Data

US 2018/0324728 A1    Nov. 8, 2018

Related U.S. Application Data

(60) Provisional application No. 62/526,966, filed on Jun. 29, 2017, provisional application No. 62/501,539, filed on May 4, 2017.

(51) Int. Cl.
| | |
|---|---|
| *H04W 56/00* | (2009.01) |
| *H04W 72/04* | (2009.01) |
| *H04L 5/00* | (2006.01) |
| *H04L 1/00* | (2006.01) |
| *H04W 48/12* | (2009.01) |
| *H04L 27/26* | (2006.01) |

(52) U.S. Cl.
CPC ....... *H04W 56/0005* (2013.01); *H04L 1/0041* (2013.01); *H04L 1/0045* (2013.01); *H04L 5/0048* (2013.01); *H04L 5/0078* (2013.01); *H04W 72/0446* (2013.01); *H04L 27/2602* (2013.01); *H04W 48/12* (2013.01); *H04W 56/001* (2013.01)

(58) Field of Classification Search
CPC ......... H04W 56/0005; H04W 72/0446; H04W 48/12; H04W 56/001; H04L 27/26; H04L 1/0045; H04L 1/0041; H04L 5/0078; H04L 5/0048
See application file for complete search history.

(56) References Cited

U.S. PATENT DOCUMENTS

2015/0029878 A1*  1/2015  Choi ............... H04W 24/08
                                              370/252
2019/0007896 A1*  1/2019  Ye ............... H04L 27/0006

FOREIGN PATENT DOCUMENTS

| WO | WO-2017127181 A1 | 7/2017 |
| WO | WO-2018089120 A1 | 5/2018 |

OTHER PUBLICATIONS

International Search Report and Written Opinion—PCT/US2018/030694—ISA/EPO—dated Jul. 17, 2018.

(Continued)

*Primary Examiner* — Afshawn M Towfighi
(74) *Attorney, Agent, or Firm* — Linda G. Gunderson; Patterson & Sheridan LLP

(57) ABSTRACT

Certain aspects of the present disclosure relate to methods and apparatus for conveying timing information that changes across a transmission time interval (TTI) in which multiple redundancy versions of a physical broadcast channel (PBCH) are transmitted.

32 Claims, 13 Drawing Sheets

(56) References Cited

OTHER PUBLICATIONS

ITL: "On NR PBCH Design", 3GPP Draft; R1-1705793 NR-PBCH, 3rd Generation Partnership Project (3GPP), Mobile Competence Centre, 650, Route Des Lucioles, F-06921, Sophia-Anti Polis Cedex, France, vol. RAN WG1, No. Spokane, USA; Apr. 3, 2017-Apr. 7, 2017 Apr. 2, 2017, XP051243907, Retrieved from the Internet: URL:http://www.3gpp.org/ftp/Meetings_3GPP_SYNC/RAN1/Docs/[retrieved on Apr. 2, 2017], 8 pages.

Qualcomm Incorporated: "SS Block, Burst-set Composition, and Time Index Indication", 3GPP Draft; R1-1705565 SS Composition and SS Time Index Indication Consideration, 3rd Generation Partnership Project (3GPP), Mobile Competence Centre, 650, Route Des Lucioles, F-06921, Sophia-Anti Polis Cedex, France, vol. RAN WG1, No. Spokane, USA; Apr. 3, 2017-Apr. 7, 2017 Apr. 2, 2017, XP051243693, Retrieved from the Internet: URL:http://www.3gpp.org/ftp/Meetings_3GPP_SYNC/RAN1/Docs/ [retrieved on Apr. 2, 2017], 10 pages.

* cited by examiner

TIMING INDICATION THROUGH DMRS/PBCH IN DIFFERENT MODES

CLAIM OF PRIORITY UNDER 35 U.S.C. § 119

The present application for patent claims benefit of U.S. Provisional Patent Application Ser. No. 62/501,539, filed May 4, 2017 and U.S. Provisional Patent Application Ser. No. 62/526,966, filed Jun. 29, 2017, both assigned to the assignee hereof and hereby expressly incorporated by reference herein.

FIELD

The present disclosure relates generally to wireless communication systems, and more particularly, to methods and apparatus for conveying timing information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR generally refers to a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide techniques for conveying timing indication though demodulation reference signals (DMRS) and physical broadcast channel (PBCH) in different modes as described herein.

Certain aspects provide a method for wireless communications by a base station (BS). The method generally includes determining, based on a physical broadcast channel (PBCH) transmission periodicity and a duration of a PBCH transmission time interval (TTI), a first set of one or more bits of a timing reference number conveyed in the PBCH that change over a duration of the TTI, transmitting multiple versions of a physical broadcast channel (PBCH) within the TTI, wherein each version of the PBCH has same content including a second set of bits of the timing reference number that do not change over the duration of the TTI, and providing an indication, with each PBCH transmission, of the first set of bits of the timing reference number.

Certain aspects provide a method for wireless communications by a user equipment (UE). The method generally includes determining, based on a physical broadcast channel (PBCH) transmission periodicity and a duration of a PBCH transmission time interval (TTI), a first set of one or more bits of a timing reference number conveyed in the PBCH that change over a duration of the TTI, decoding at least one of multiple versions of a physical broadcast channel (PBCH) within the TTI, wherein each version of the PBCH has same content including a second set of bits of the timing reference number that do not change over the duration of the TTI, and obtaining an indication, with each decoded PBCH transmission, of the first set of bits of the timing reference number.

Certain aspects provide an apparatus for wireless communications by a base station. The apparatus generally includes means for determining, based on a physical broadcast channel (PBCH) transmission periodicity and a duration of a PBCH transmission time interval (TTI), a first set of one or more bits of a timing reference number conveyed in the PBCH that change over a duration of the TTI, means for transmitting multiple versions of a physical broadcast channel (PBCH) within the TTI, including a second set of bits of the timing reference number that do not change over the duration of the TTI, and means for providing an indication, with each PBCH transmission, of the first set of bits of the timing reference number.

Certain aspects provide an apparatus for wireless communications by a wireless device. The apparatus generally includes means for determining, based on a physical broadcast channel (PBCH) transmission periodicity and a duration of a PBCH transmission time interval (TTI), a first set of one or more bits of a timing reference that change over a duration of the TTI, means for decoding at least one of multiple versions of a physical broadcast channel (PBCH) within the TTI, wherein including a second set of bits of the timing reference number that do not change over the duration of the TTI, and means for obtaining an indication, with each decoded PBCH transmission, of the first set of bits of the timing reference number.

Certain aspects provide an apparatus for wireless communications by a wireless device. The apparatus generally includes at least one processor coupled with a memory and configured to determine, based on a physical broadcast channel (PBCH) transmission periodicity and a duration of a PBCH transmission time interval (TTI), a first set of one or more bits of a timing reference number conveyed in the PBCH that change over a duration of the TTI and a transceiver configured to transmit multiple versions of a physical broadcast channel (PBCH) within the TTI, including a second set of bits of the timing reference number that do not change over the duration of the TTI and to provide an indication, with each PBCH transmission, of the first set of bits of the timing reference number.

Certain aspects provide an apparatus for wireless communications by a wireless device. The apparatus generally includes at least one processor coupled with a memory and configured to determine, based on a physical broadcast channel (PBCH) transmission periodicity and a duration of a PBCH transmission time interval (TTI), a first set of one or more bits of a timing reference that change over a duration of the TTI and a decoder configured to decode at least one of multiple versions of a physical broadcast channel (PBCH) within the TTI, wherein including a second set of bits of the timing reference number that do not change over the duration of the TTI and to obtain an indication, with each decoded PBCH transmission, of the first set of bits of the timing reference number.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
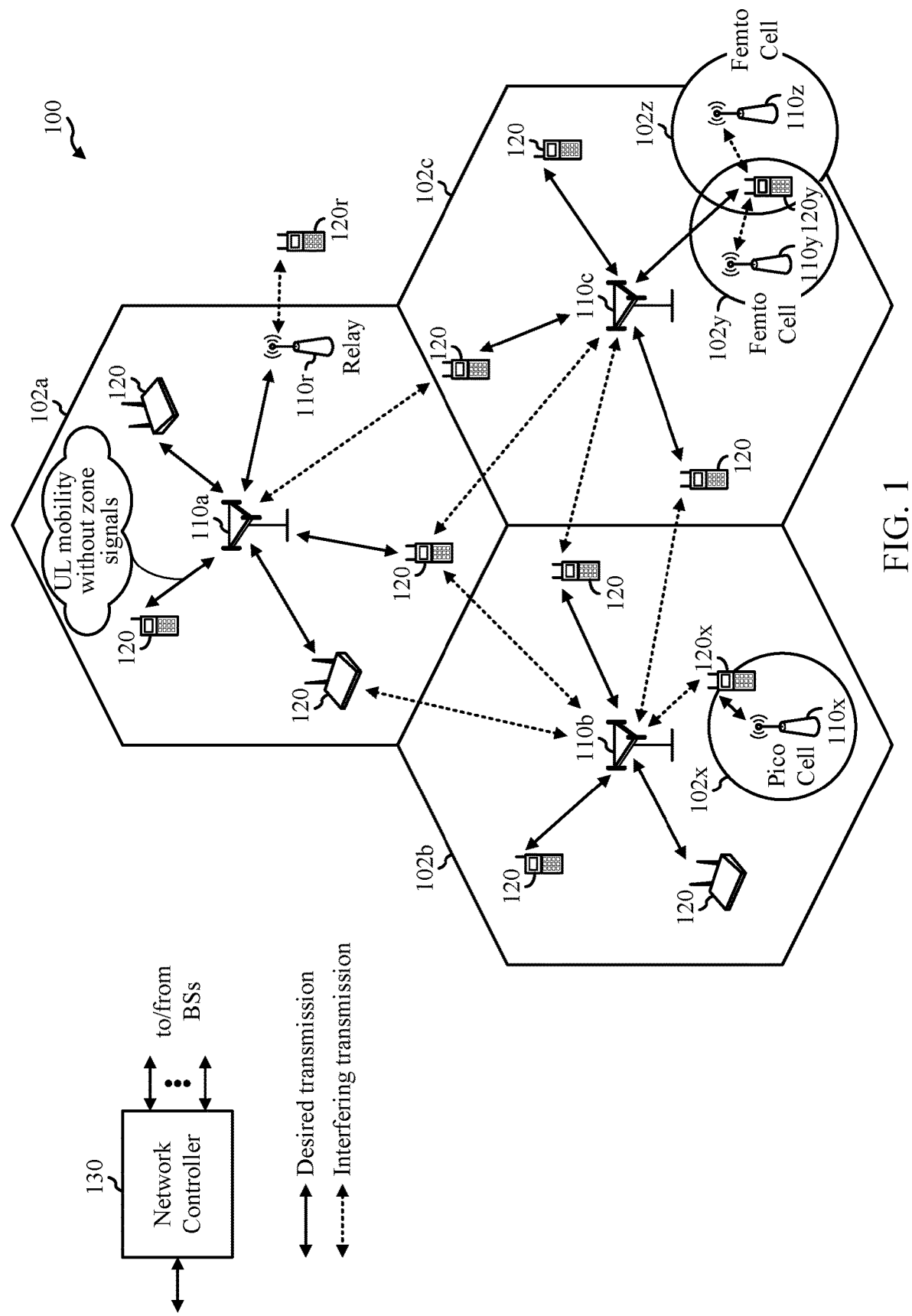
FIG. 1 is a block diagram conceptually illustrating an example telecommunications system, in accordance with certain aspects of the present disclosure.

Aspects of the present disclosure relate to methods and apparatus for conveying timing information that may change, for example, within a transmission time interval over which redundant versions of a PBCH are transmitted.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
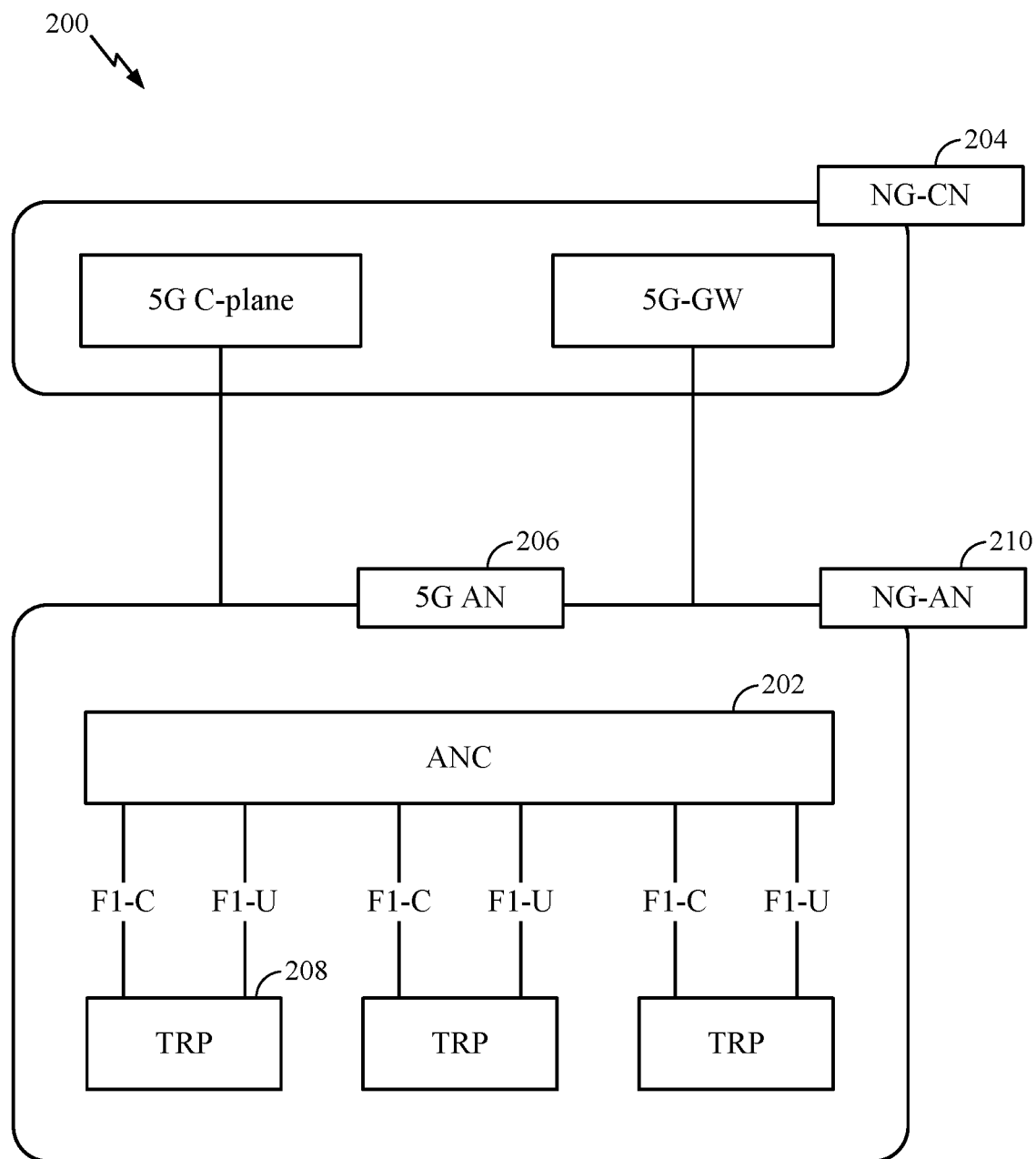
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
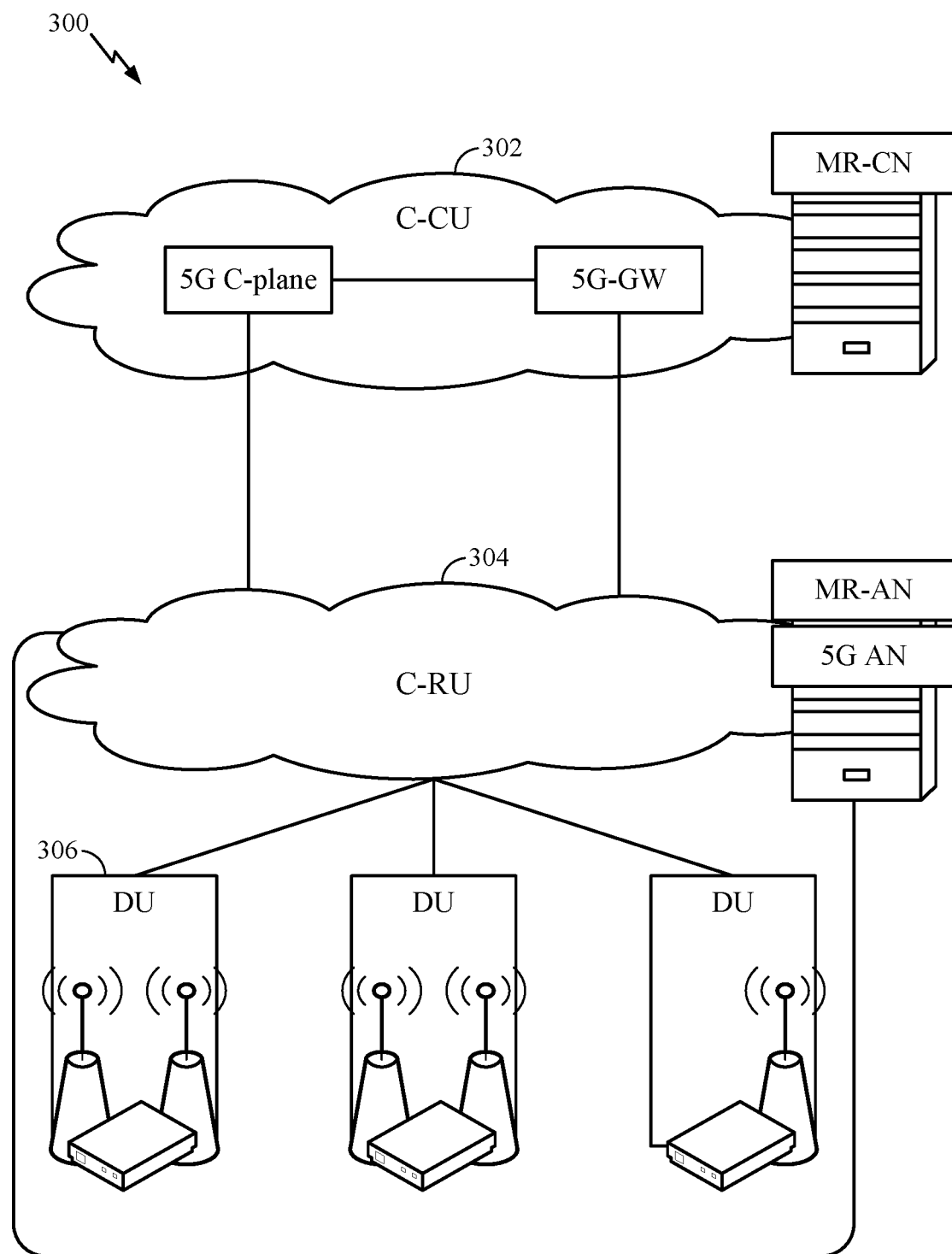
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
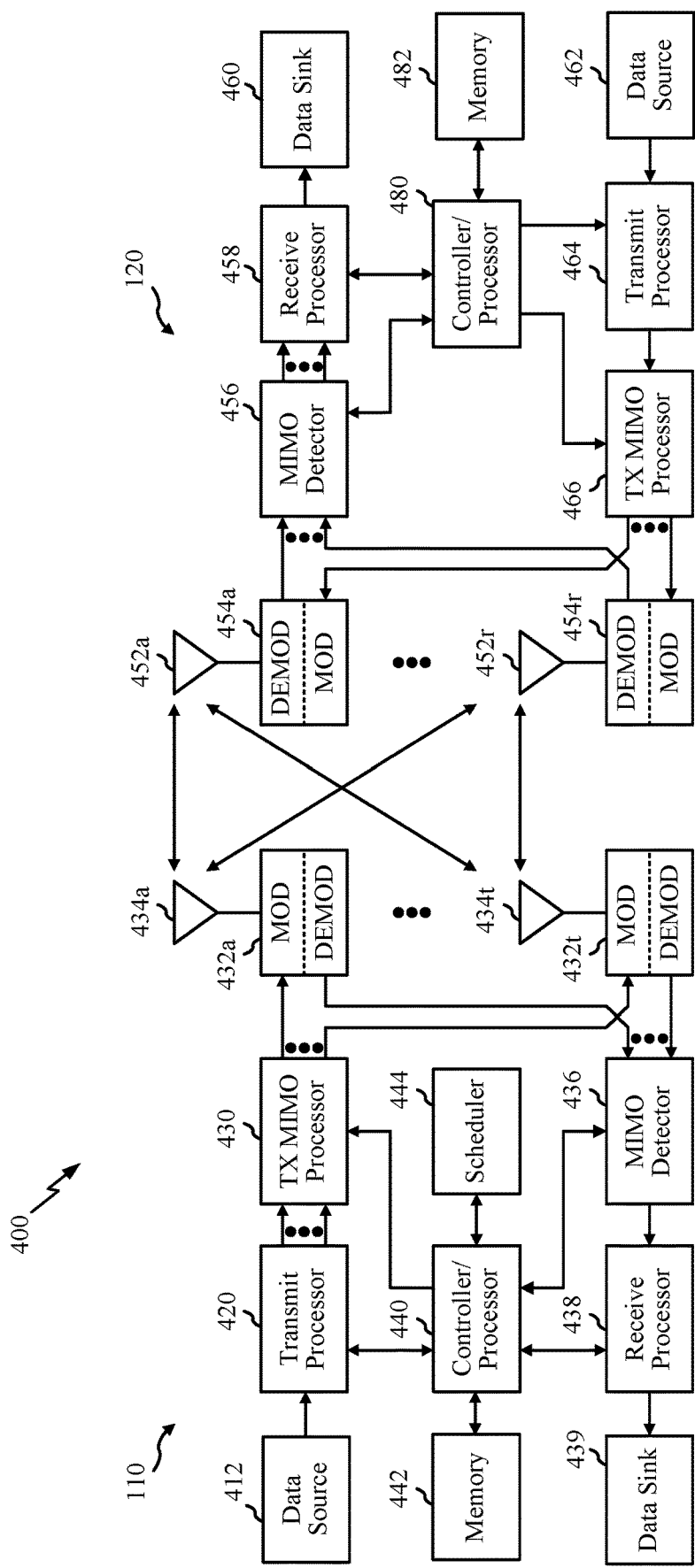
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 8-11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
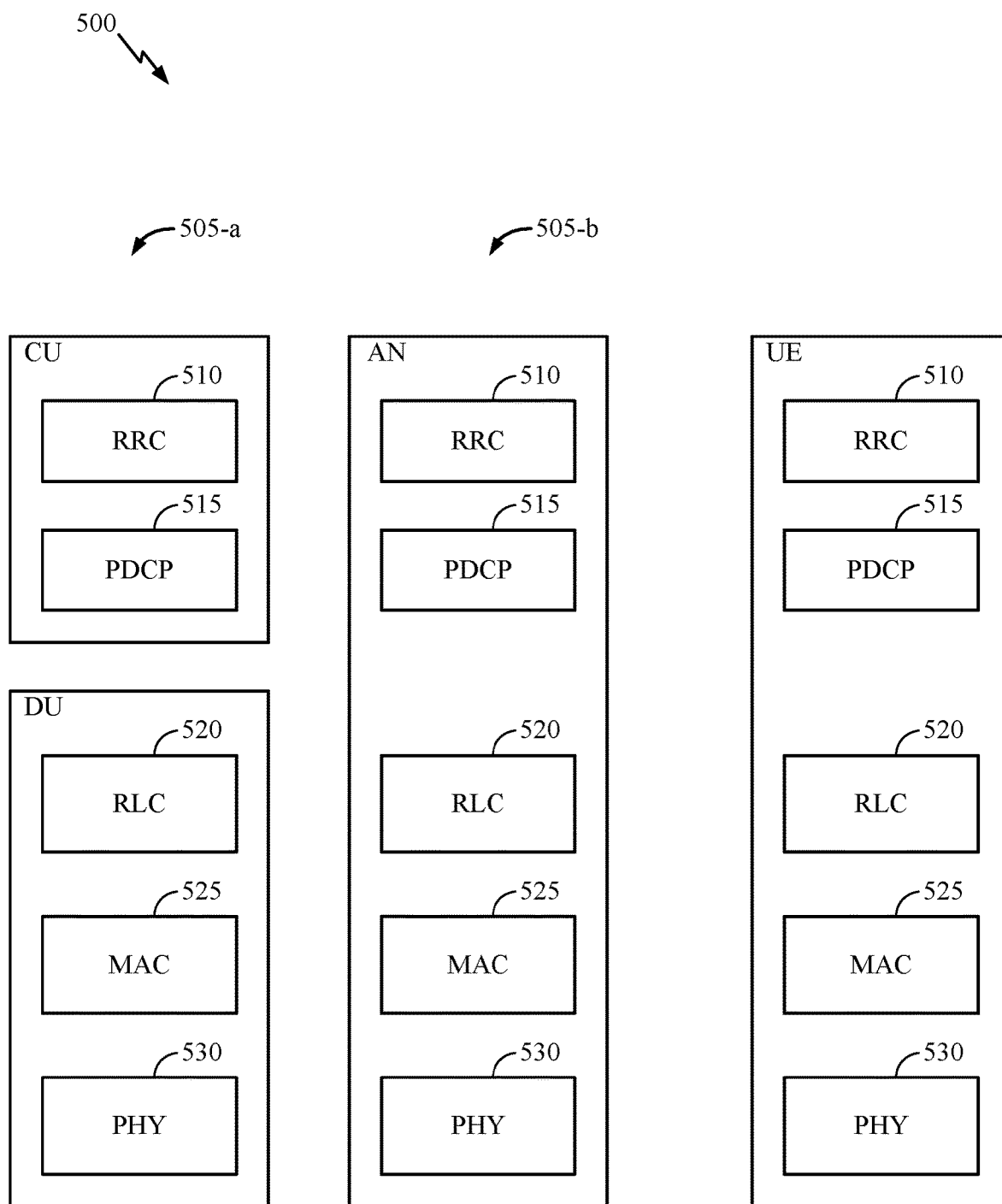
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
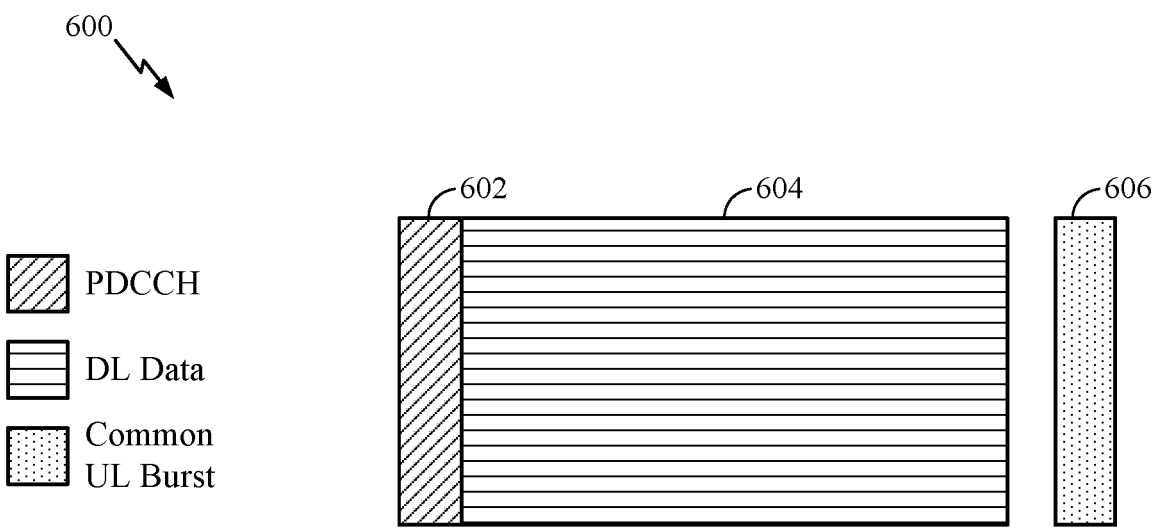
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6A:
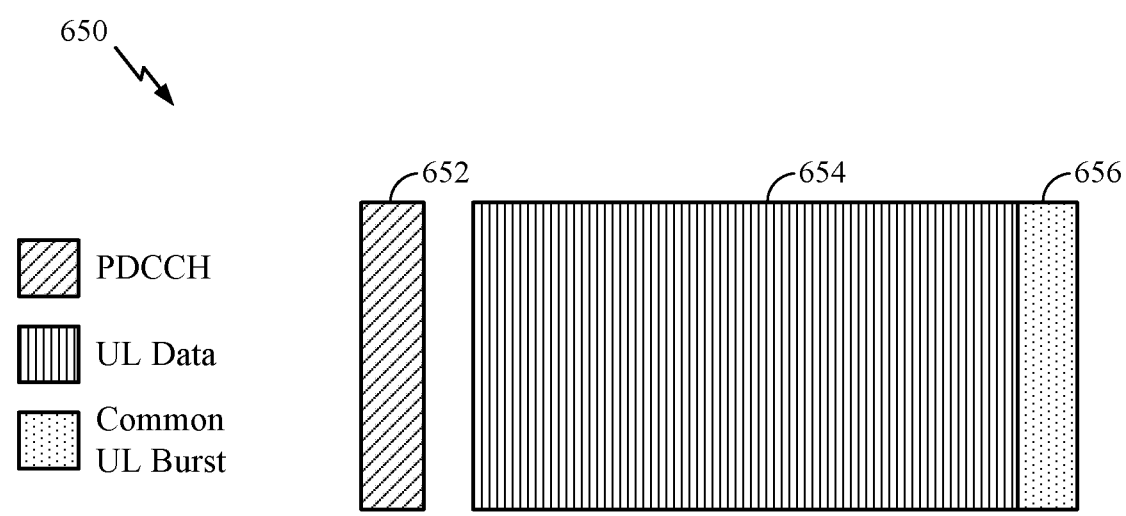
FIG. 6A illustrates an example of an uplink-centric (UL-centric) subframe, in accordance with certain aspects of the present disclosure.

FIG. 6A is a diagram 650 showing an example of an UL-centric subframe. The UL-centric subframe may include a control portion 652. The control portion 652 may exist in the initial or beginning portion of the UL-centric subframe. The control portion 652 in FIG. 6A may be similar to the control portion described above with reference to FIG. 6. The UL-centric subframe may also include an UL data portion 654. The UL data portion 654 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 652 may be a physical DL control channel (PDCCH).

As illustrated in FIG. 6A, the end of the control portion 652 may be separated in time from the beginning of the UL data portion 654. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 656. The common UL portion 656 in FIG. 6A may be similar to the common UL portion 656 described above with reference to FIG. 6A. The common UL portion 656 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example PBCH TTI

In some cases, control information may be "bundled" as multiple transmissions within a time period referred to as a transmission time interval (TTI). For example, different "redundant" versions of the same information may be periodically transmitted within the TTI, allowing a receiver to combine multiple instances of the information to achieve better decoding performance.

Figure 7:
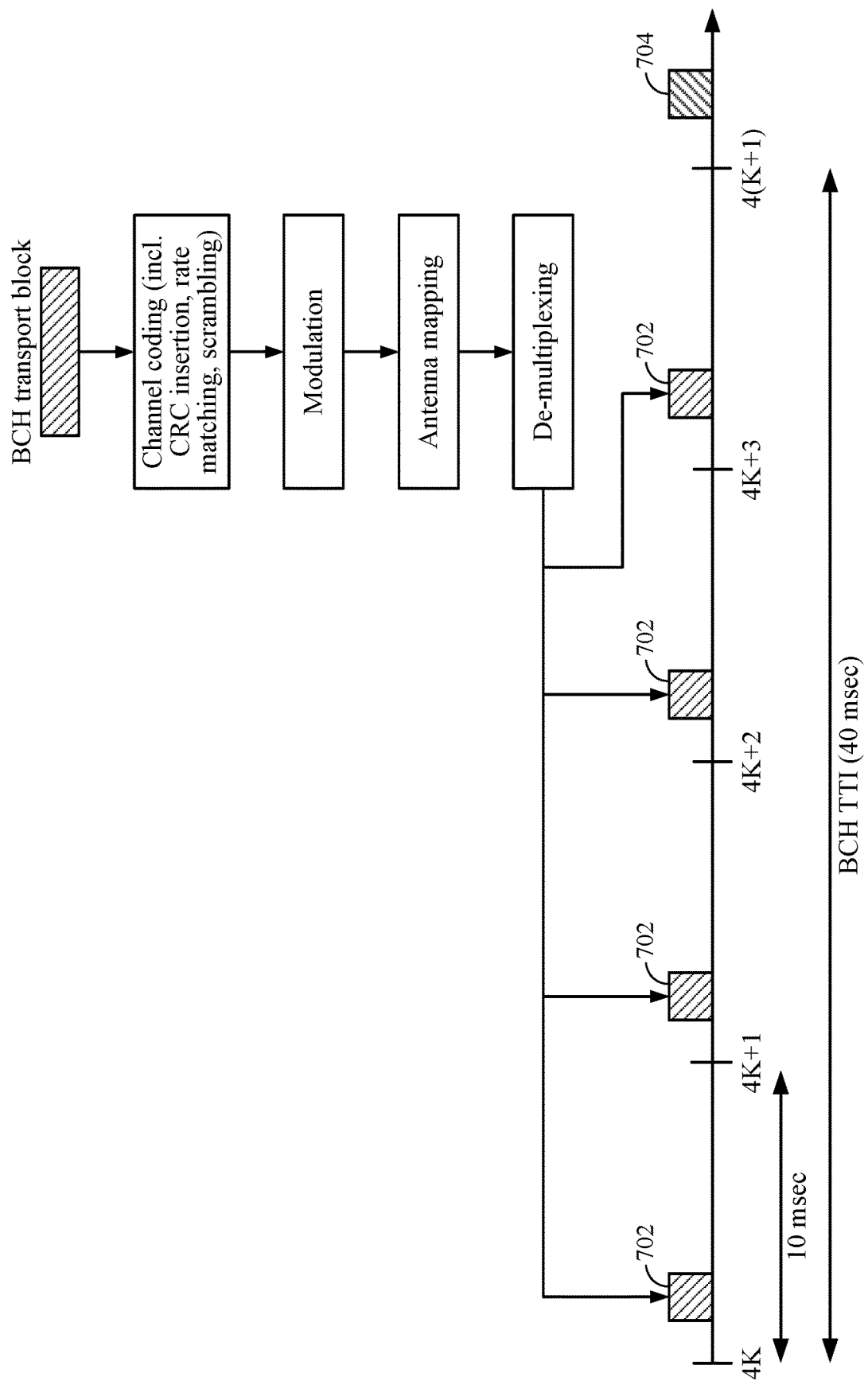
FIG. 7 illustrates an example physical broadcast channel (PBCH) transmission time interval (TTI) and transmission periodicity.

For example, as illustrated in FIG. 7, in LTE, PBCH may be transmitted with a periodicity of 10 msec, within a 40 msec BCH TTI. Each instance 702 of PBCH within a BCH TTI is one RV (redundancy version) of the coded blocks (RV0, RV1, RV2, RV3). The UE can combine multiple instances 702 of PBCH within a BCH TTI, before decoding, to get a better performance. However, the UE needs to blindly decode the redundancy version to perform combining—as the coded information in a subsequent instance 704 of PBCH may change in the next TTI.

The MIB (master Information Block) is transmitted thru PBCH. The MIB carries SFN (System Frame Number) bits as a timing reference. The MIB carries all SFN bits except the two LSBs (least significant bits). The two LSBs may be acquired by the UE through PBCH decoding.

In other words, because four 10 msec frames fit within a 40 msec TTI, only the 2 LSBs of the SFN will change within the TTI. Thus, the other bits can be included in the different redundancy versions while maintaining the same content, which allows for combining.

In some cases, a first radio frame structure (referred to as type 1) is used for FDD (for both full duplex and half duplex operation) and has a duration of 10 ms and consists of 20 slots with a slot duration of 0.5 ms. In this case, two adjacent slots form one sub-frame of length 1 ms. A second radio frame structure (referred to as type 2) is used for TDD and is formed by two half-frames with a duration of 5 ms each. Each half-frame includes either 10 slots of length 0.5 ms, or 8 slots of length 0.5 ms and three special fields (DwPTS, GP and UpPTS) which have configurable individual lengths and a total length of 1 ms, with support for both 5 ms and 10 ms downlink-to-uplink switch-point periodicity.

Example Synchronization Signal Block Design

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), and PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes, such as radio link management (RLM), beam management, and the like. For example, a UE may measure the cell quality and report the quality back in the form of a measurement report, which may be used by the base station for beam management and other purposes.

Figure 8:
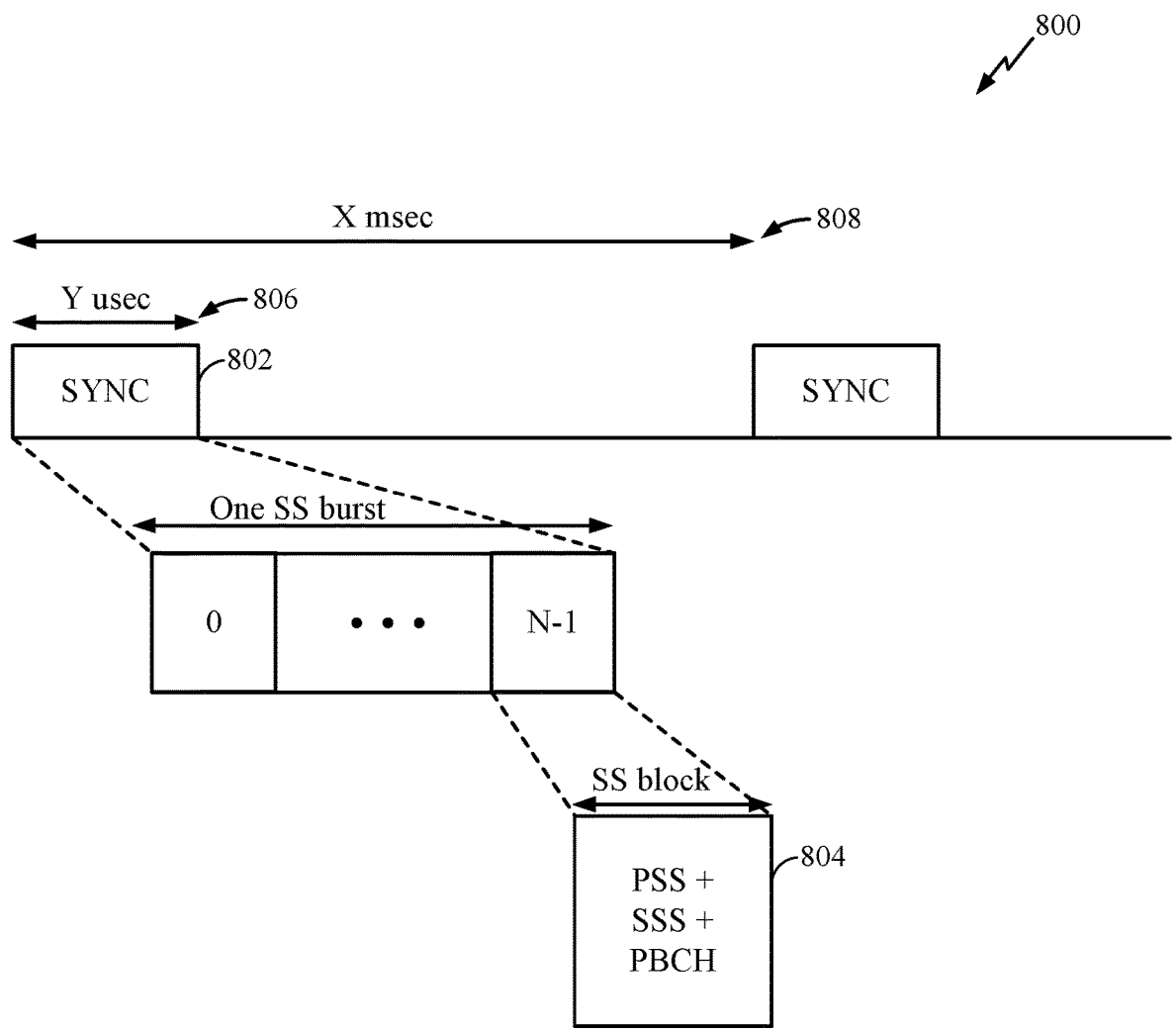
FIG. 8 example transmission timeline of synchronization signals for a new radio telecommunications system, in accordance with aspects of the present disclosure.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y μsec, in accordance with certain aspects of the present disclosure. The SS burst 802 may include N SS blocks 804 with indices of zero to N−1, and the BS may transmit different SS blocks of the burst using different transmit beams (e.g., for beam-sweeping). As noted above, each SS block may include, for example, a PSS, an SSS, and one or more PBCHs. The BS may transmit SS bursts on a periodic basis, with a period 808 of X msec.

Figure 9:
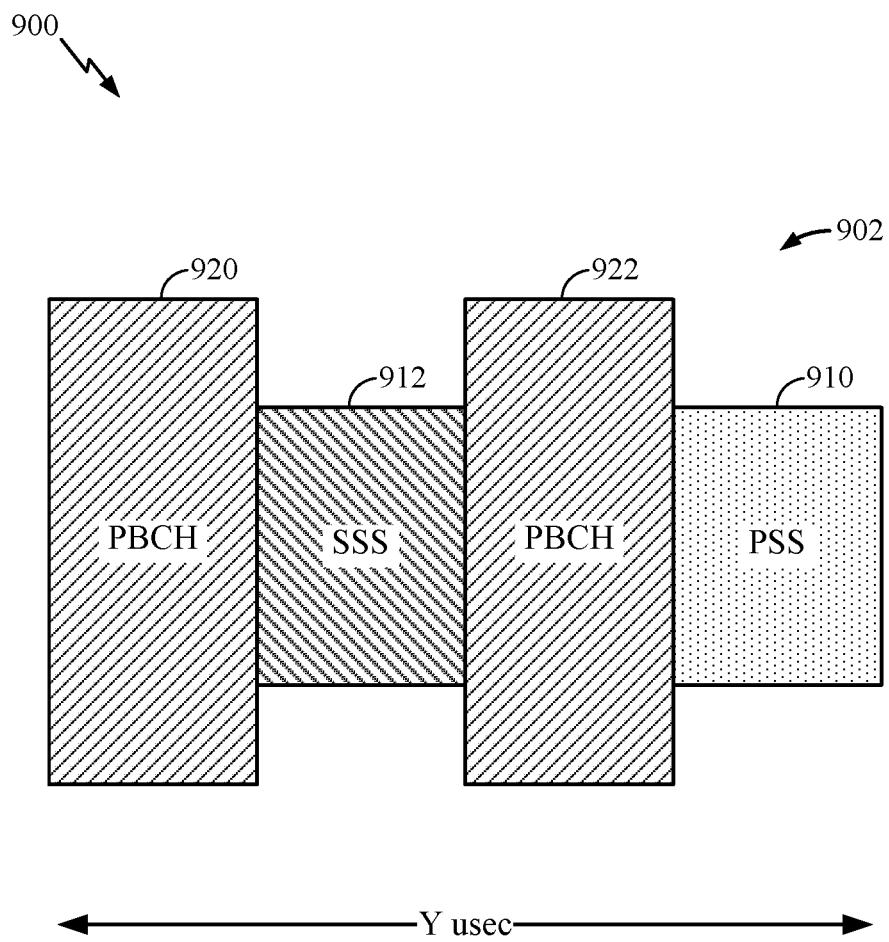
FIG. 9 illustrates an example resource mapping for an exemplary sync signal (SS) block (SSB), in accordance with aspects of the present disclosure.

FIG. 9 illustrates an example resource mapping 900 for an exemplary SS block 902, in accordance with aspects of the present disclosure. The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones. As shown in FIG. 9, PSS, SSS and PBCH (and DMRS for PBCH) within an SS block are multiplexed in time-domain.

There are different synchronization modes: initial acquisition in standalone, initial acquisition in non-standalone, and Synchronization in idle or connected modes. As will be described herein, these different synchronization modes may have different PBCH TTI and PBCH transmission periodicities. As a result, different SFN bits may change within a TTI, presenting a challenge to maintain same content in each redundancy version.

Example Timing Indication Through MIB

Certain aspects of the present disclosure relate to methods and apparatus for conveying timing information that changes across a transmission time interval (TTI) in which multiple redundancy versions of a physical broadcast channel (PBCH) are transmitted.

Figure 10:
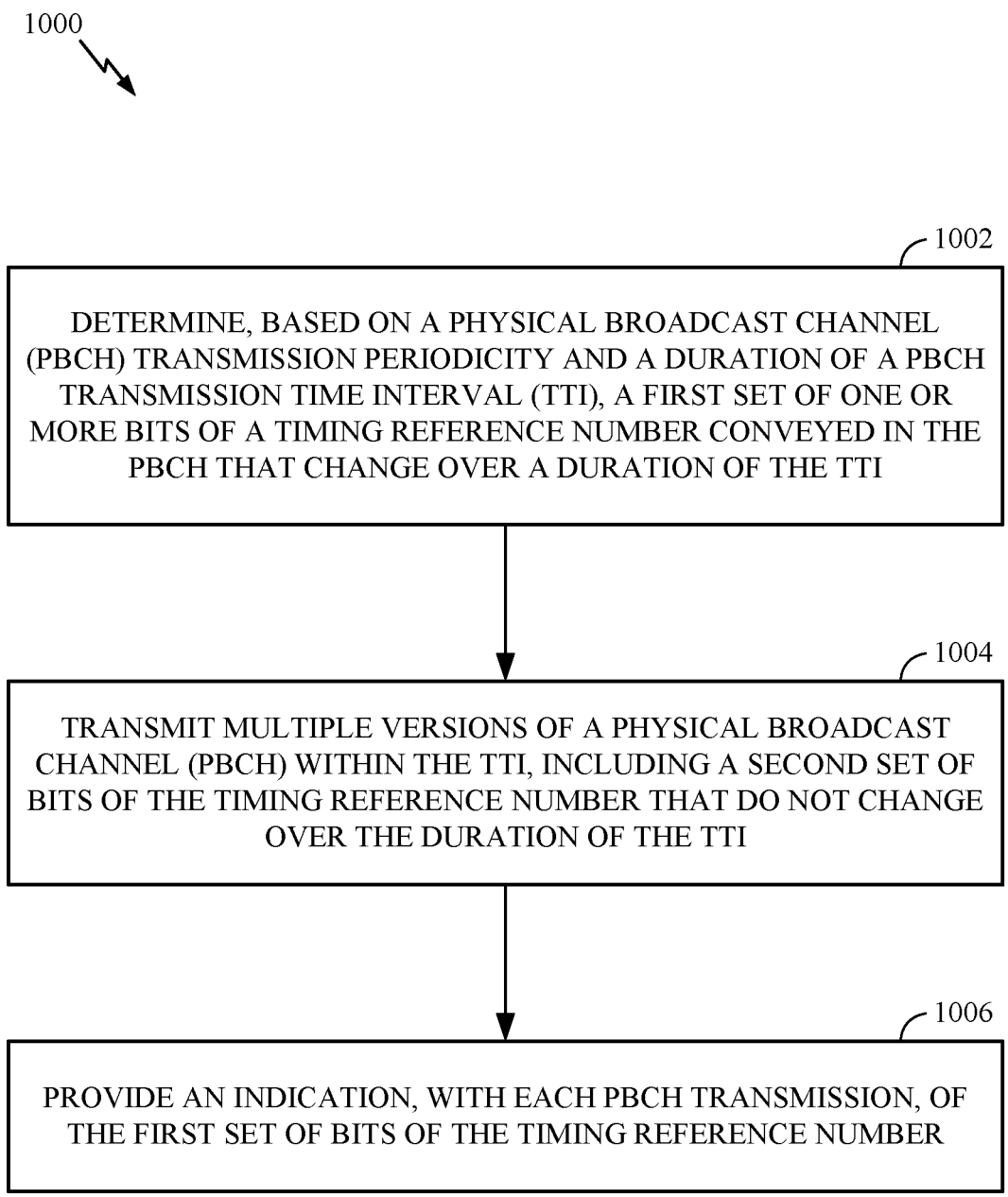
FIG. 10 illustrates example operations for wireless communications by a base station, in accordance with certain aspects of the present disclosure.

FIG. 10 illustrates example operations 1000 for conveying timing information by a base station (BS), such as BS 110 shown in FIG. 1 (or some other type of network entity), in accordance with aspects of the present disclosure.

Operations 1000 begin, at 1002, by determining, based on a physical broadcast channel (PBCH) transmission periodicity and a duration of a PBCH transmission time interval (TTI), a first set of one or more bits of a timing reference number conveyed in the PBCH that change over a duration of the TTI. At 1004, the base station transmits multiple versions of a physical broadcast channel (PBCH) within the TTI, including a second set of bits of the timing reference number that do not change over the duration of the TTI. At 1006, the base station provides an indication, with each PBCH transmission, of the first set of bits of the timing reference number.

Figure 11:
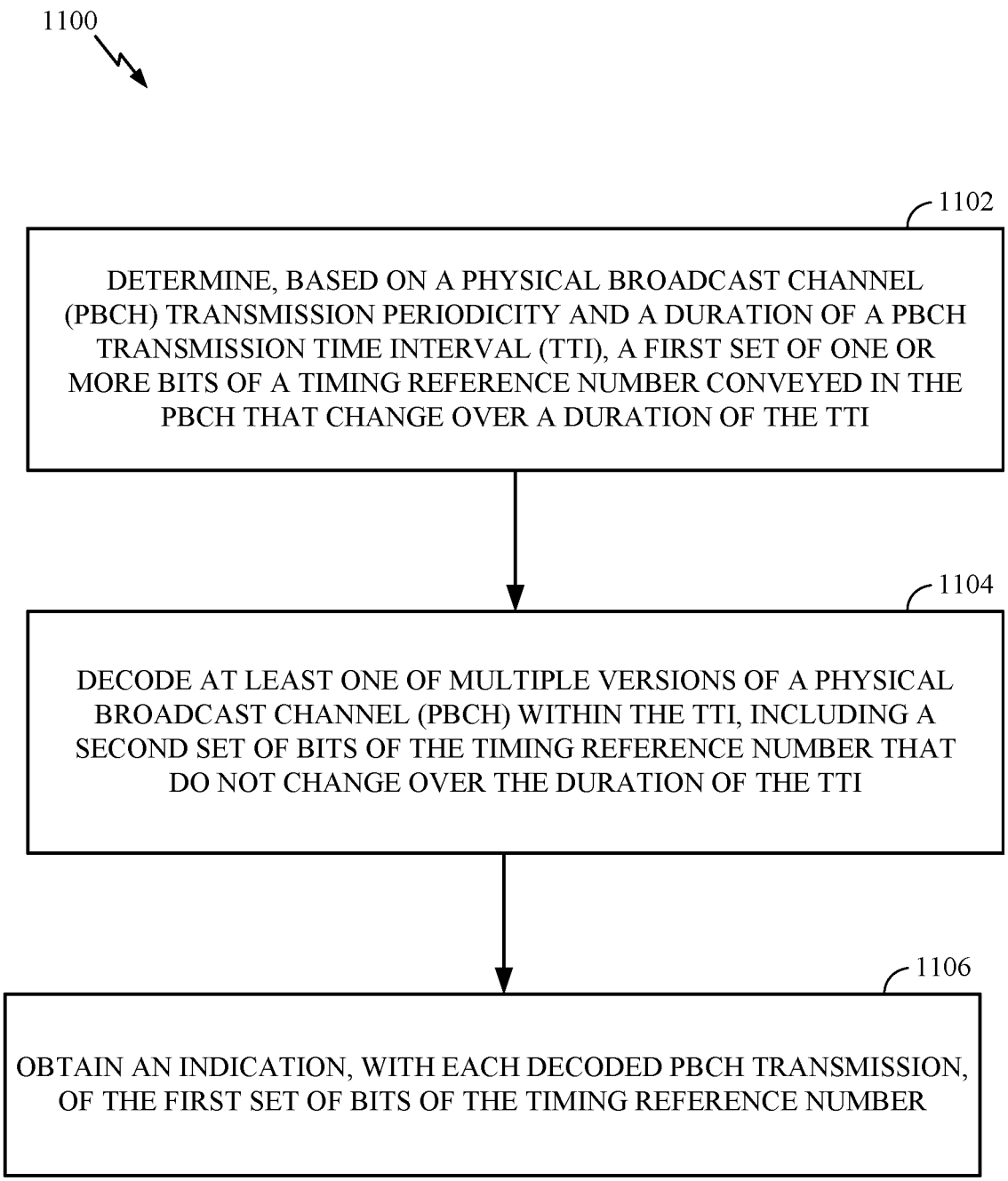
FIG. 11 illustrates example operations for wireless communications by a user equipment (UE), in accordance with certain aspects of the present disclosure.

FIG. 11 illustrates example operations 1100 for wireless communications by a user equipment (UE), such as UE 120 shown in FIG. 1 (or some other type of wireless device such as a wireless device serving as a backhaul relay), in accordance with aspects of the present disclosure. For example, a UE may perform operations 1100 to decode timing information conveyed by a BS in accordance with operations 1000.

Operations 1100 begin, at 1102, by determining, based on a physical broadcast channel (PBCH) transmission periodicity and a duration of a PBCH transmission time interval (TTI), a first set of one or more bits of a timing reference number conveyed in the PBCH that change over a duration of the TTI. At 1104, the UE decodes at least one of multiple versions of a physical broadcast channel (PBCH) within the TTI, including a second set of bits of the timing reference number that do not change over the duration of the TTI. At 1106, the UE obtains an indication, with each decoded PBCH transmission, of the first set of bits of the timing reference number.

As noted above, due to the different TTI and BCH transmission periodicity, different SFN bits may change within a TTI, depending on the synchronization mode.

Figure 12:
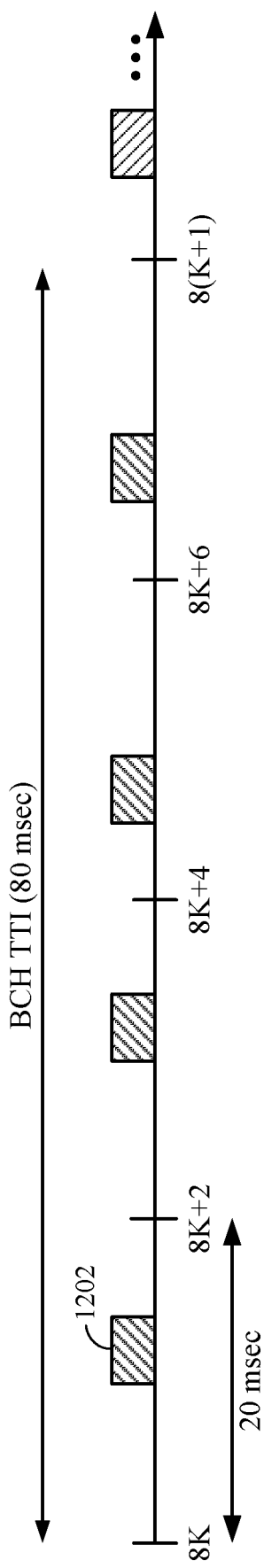
FIG. 12 illustrates another example physical broadcast channel (PBCH) transmission time interval (TTI) and transmission periodicity.

For example, as illustrated in FIG. 12, during an initial acquisition in standalone synchronization mode, PBCH instances 1202 may have a 20 msec transmission periodicity and an 80 msec BCH TTI.

Figure 13:
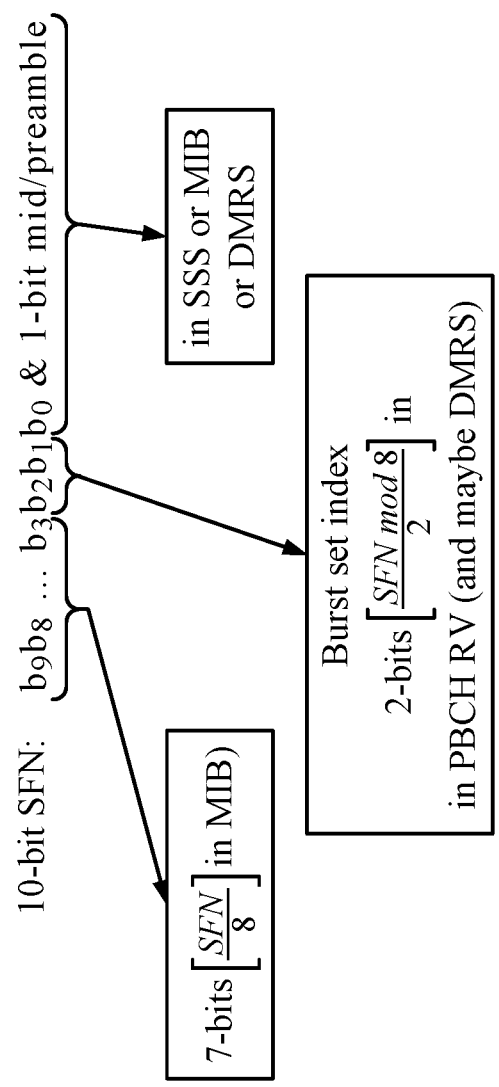
FIG. 13 illustrates how timing information for the configuration of FIG. 12 may be conveyed.

FIG. 13 illustrates how PBCH content may change within a TTI, again assuming 10 msec frames. As illustrated, with a 20 msec transmission periodicity the LSB (bit b0) will not change in each redundancy version, while bits 3-9 will also not change within an 80 ms TTI. On the other hand, bits 2 and 1 (b2 and b1) will change in each transmission period.

Therefore, to keep the content in each redundancy version the same and allow for combining, bits b0 and b3-b9 can be conveyed in the MIB, while bits b1 and b2 may be conveyed separately.

For example, bits b1 and b2 may be conveyed in a synchronization signal, MIB, or DMRS. In some cases, values for these bits may be conveyed as a burst set index or may be conveyed as a PBCH redundancy version. In other words, each of the four different values (for the 2-bit combination) may be mapped to the four different redundancy versions.

As illustrated, in some cases, to indicate the 5 msec (half-frame) boundaries within a frame (half-frame boundaries), an extra bit may be conveyed (e.g., as a preamble/midamble). In other words, that extra bit may provide a half-frame indication, for example, indicating one of two half-frames within a frame.

In some cases, longer transmission periodicities may be used (e.g. 40, 80, or 160 msec) for idle/connected mode or initial acquisition in non-standalone modes. In such cases, to allow PBCH combining, the BCH TTI may be increased accordingly for these modes.

Figure 14:
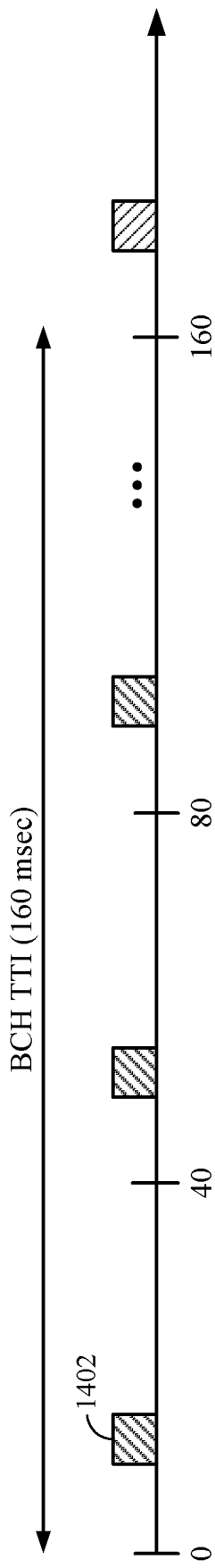
FIG. 14 illustrates still another example physical broadcast channel (PBCH) transmission time interval (TTI) and transmission periodicity.

For example, FIG. 14 illustrates an example configuration with a 160 msec BCH TTI, with a transmission periodicity (within the TTI) of 40 msec for each PBCH instance 1402.

Figure 15:
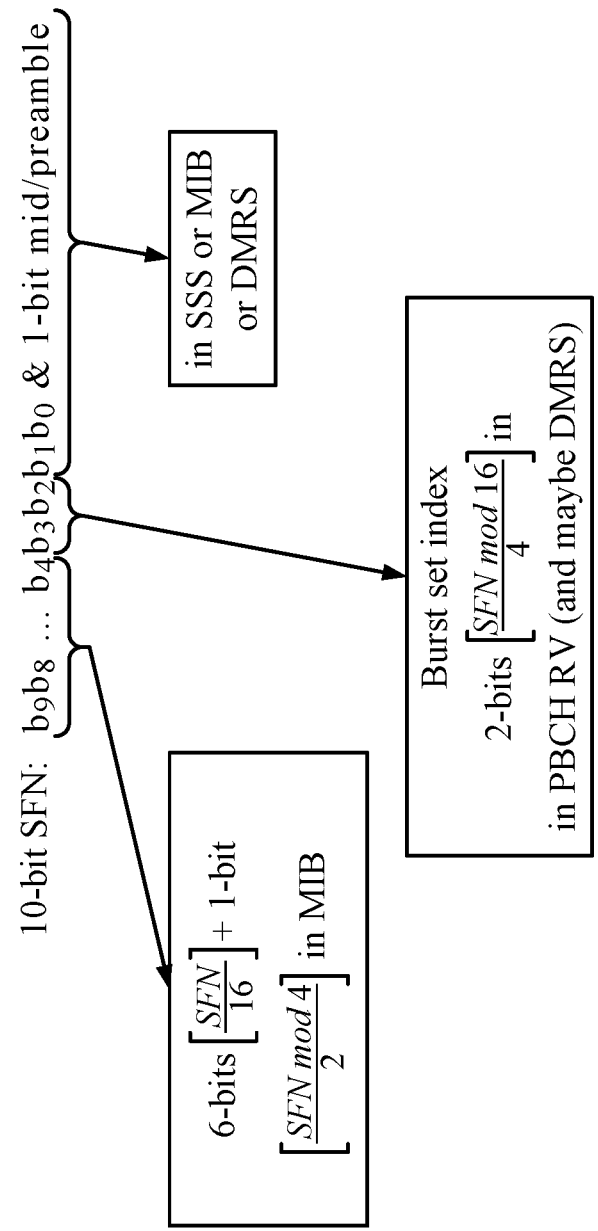
FIG. 15 illustrates how timing information for the configuration of FIG. 14 may be conveyed.

FIG. 15 illustrates how the particular SFN bits of the MIB content may also change accordingly with a 160 msec BCH TTI. In this example, due to the 40 msec periodicity for transmission of each PBCH instance, bits b1 and b0 will not change with each redundancy version. On the other hand, bits b2 and b3 will change. Therefore, bits b0-b1 and bits b4-b9 may be conveyed in the MIB, while bits b3 and b2 may be conveyed in another manner, as described above to assure the content does not change over the longer TTI and combining may still be performed to enhance decoding performance.

Of course, various combinations of PBCH periodicity (e.g., 20 msec, 40 msec) and BCH TTI (80 msec, 160 msec) may be used and the particular SFN bits transmitted in the MIB rather than via other mechanisms may be adjusted accordingly. In some cases, 2 bits may be conveyed via RV and/or DMRS, while 2 bits may be conveyed through a synchronization signal (e.g., SSS).

As described herein, in some cases, the configuration to carry timing information in MIB is determined based on the determined PBCH Tx periodicity and the BCH TTI. As noted above, these parameters may be determined based on the operation mode (e.g., initial acquisition in standalone, for one or multiple UEs in RRC-idle or RRC-connected mode, in non-standalone).

As demonstrated in the examples described above, BCH TTI may be chosen to be an integer number of PBCH Tx instances (e.g., 4 or 2).

In some cases, such information about periodicity and BCH TTI may be indicated to the UE. For example, this information may be preconfigured (e.g., in a standard specification), via a master information block (MIB), system information block (SIB), or radio resource control (RRC) message signaling for the same cell or neighboring cell (in other words, one base station may transmit the information while another base station transmits the PBCH).

In dual connectivity scenarios, where a device communicates via at least two different radio access technologies (RATs), the information may be conveyed in one RAT, while PBCH is transmitted in another RAT. For example, in an LTE-NR dual connectivity mode, information for NR may be provided via LTE. As another example, for a dual connectivity mode involving two types of new radio (NR1-NR2 dual connectivity mode), a sub-6 GHz NR1 may provide information for an over-6 GHz NR2.

As noted in the examples described above, timing information conveyed in the manner may refer to a SFN (system frame number). In some cases, timing information conveyed may refer to subframe-level timing (e.g., midamble/pre-amble to indicate 5 msec subframe boundaries) or symbol-level timing (e.g., SS block index within a SS burst set).

In any case, the timing indication configuration is determined in a way to enable combining multiple instances of PBCH within a BCH TTI. As described above, part of timing information that indicates the location of a PBCH instance within the BCH TTI may not explicitly carried in the MIB content, but may be conveyed via other means (e.g., PBCH RV and/or SSS/DMRS/PSS).

In some cases, this timing information may be carried in both PBCH RV and a combination of SSS/DMRS/PSS (it means there is some redundancy). In this case, if the UE can successfully acquire (part of) this info from SSS/DMRS/PSS, it can reduce the complexity of PBCH processing by avoiding (part of) an RV blind detection.

As described in the examples above, if the timing information refers to an X-bit SFN (e.g. with X=10), then out of X bits, b bits (e.g. b=2) that identify the location of PBCH instance within a BCH TTI may not be carried in MIB, but may be conveyed via other means.

Example Timing Indication Through DMRS/PBCH in Different Modes

According to certain aspects timing indication may also (additionally or as an alternative) be provided via demodulation reference signals (DMRS) and physical broadcast channel (PBCH) transmissions in different modes.

As described therein, in some cases, a UE may (at least partially) infer the sync periodicity (periodicity of sync bursts) through the detection of multiple instances of DMRS. After inferring such information, the UE may use the inferred information for PBCH processing (e.g., combining of multiple PBCH transmissions).

In some cases, the DMRS/PBCH scrambling design (in terms of timing indication scheme) may be the same for a first set of sync periods and may be sync period-dependent for a second set (of sync periods). In other words, for a first set of PBCH TTIs, a design of the DMRS and scrambling sequence is the same for each PBCH TTI while, for a second set of PBCH TTIs, the design of the DMRS and scrambling sequence is PBCH TTI-dependent.

As described above, timing information may be provided in MIB (PBCH content), DMRS, SSS, PBCH redundancy version (RV). In some cases, timing information may be provided via a 'PBCH scrambling sequence.' As an example, instead of (or in addition to) conveying information via PBCH RV, such information may be conveyed via a PBCH scrambling sequence.

Various alternatives exist for conveying timing information via DMRS/PBCH. For example, for a first alternative (Alt 1), in non-standalone mode or RRC-idle/connected modes, the burst set periodicity can take any value in {5,10,20,40,80,160} msec DMRS and PBCH scrambling may convey the same timing information (e.g., $b_2 b_1$) irrespective of burst set periodicities.

For a second alternative (Alt 2), DMRS and PBCH scrambling may convey different timing information for different burst set periodicities, such as:

5 msec periodicity: $b_0$ & 1-bit pre/mid-amble
10 msec periodicity: $b_1 b_0$
20 msec periodicity: $b_2 b_1$
40 msec periodicity: $b_3 b_2$
80 msec periodicity: $b_4 b_3$
160 msec periodicity: $b_5 b_4$.

In some cases, in order to enable a UE to acquire timing with no ambiguity, burst set periodicity (3 bits) may be conveyed in the PBCH content as well.

For a third alternative (Alt 3), DMRS and PBCH scrambling convey the same timing information (e.g., $b_2 b_1$) for periodicities below a certain threshold (e.g., <=20 msec, and may convey different timing information for larger periodicities, such as:

40 msec periodicity: $b_3 b_2$
80 msec periodicity: $b_4 b_3$
160 msec periodicity: $b_5 b_4$.

This approach may have certain benefits. For example, using this approach, (1) DMRS and PBCH scrambling randomization may be achieved for all sync burst periodicities below the threshold value (<=20 msec); and (2) there may be no need for PBCH blind decoding when combining across burst sets.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for decoding (a decoder) and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station, comprising:
   determining, based on a physical broadcast channel (PBCH) transmission periodicity and a duration of a PBCH transmission time interval (TTI), a first set of one or more bits of a timing reference number conveyed in the PBCH that change over a duration of the TTI, wherein a location of the first set of one or more bits within the timing reference number is different for different durations of the PBCH TTI;
   transmitting multiple versions of a physical broadcast channel (PBCH) within the TTI, including a second set of bits of the timing reference number that do not change over the duration of the TTI; and
   providing an indication, with each PBCH transmission, of the first set of bits of the timing reference number.

2. The method of claim 1, wherein the timing reference number comprises at least one of: a system frame number (SFN), an indication of subframe-level, an indication of symbol-level timing, a synchronization signal block (SSB) index, or an indication of a half-frame.

3. The method of claim 1, wherein different synchronization modes have different duration of the TTI.

4. The method of claim 3, wherein different synchronization modes comprise at least two of: an initial acquisition in standalone mode, an initial acquisition in non-standalone mode, a synchronization in idle mode, synchronization provided to another base station in a backhaul network or a connected mode.

5. The method of claim 1, wherein the indication is provided via at least one of a synchronization signal, a master information block (MIB) or a demodulation reference signals (DMRS).

6. The method of claim 1, wherein:
   the indication is provided via at least one of a redundancy version or a scrambling sequence of the PBCH transmissions; and
   different values of the first set of bits are mapped to different redundancy versions.

7. The method of claim 1, wherein the indication is provided via at least two of:
   a synchronization signal, a master information block (MIB), a demodulation reference signals (DMRS), a scrambling sequence, or a mapping of different values of the first set of bits to different redundancy versions of the PBCH.

8. The method of claim 7, wherein when the indication is provided via the DMRS and the scrambling sequence, both the DMRS and the scrambling sequence carry a portion of a synchronization signal block (SSB) index.

9. The method of claim 7, wherein when the indication is provided via the DMRS and the scrambling sequence:
   for a first set of PBCH TTIs, a design of the DMRS and scrambling sequence is the same for each PBCH TTI; and
   for a second set of PBCH TTIs, the design of the DMRS and scrambling sequence is PBCH TTI-dependent.

10. The method of claim 7, wherein when the indication is provided via the DMRS and the MIB, both the DMRS and the MIB carry a portion of an indication of a half-frame.

11. The method of claim 1, further comprising conveying information about the PBCH periodicity and/or TTI duration to a wireless device.

12. The method of claim 11, wherein the information is conveyed via at least one of a master information block (MIB), system information block (SIB), or radio resource control (RRC) signaling.

13. The method of claim 11, wherein:
   the information is conveyed via a first radio access technology (RAT) network; and
   the PBCH is transmitted via a second RAT network.

14. A method for wireless communications by a wireless device, comprising:
   determining, based on a physical broadcast channel (PBCH) transmission periodicity and a duration of a PBCH transmission time interval (TTI), a first set of one or more bits of a timing reference that change over a duration of the TTI, wherein a location of the first set of one or more bits within the timing reference number is different for different durations of the PBCH TTI;
   decoding at least one of multiple versions of a physical broadcast channel (PBCH) within the TTI, wherein including a second set of bits of the timing reference number that do not change over the duration of the TTI; and obtaining an indication, with each decoded PBCH transmission, of the first set of bits of the timing reference number.

15. The method of claim 14, wherein the timing reference number comprises at least one of: a system frame number (SFN), an indication of subframe-level, an indication of symbol-level timing, a synchronization signal block (SSB) index, or an indication of a half-frame.

16. The method of claim 14, wherein different synchronization modes have different duration of the TTI.

17. The method of claim 16, wherein different synchronization modes comprise at least two of: an initial acquisition in standalone mode, an initial acquisition in non-standalone mode, a synchronization in idle mode, synchronization provided to another base station in a backhaul network, or a connected mode.

18. The method of claim 14, wherein the indication is provided via at least one of a synchronization signal, master information block (MIB) or demodulation reference signals (DMRS).

19. The method of claim 14, wherein:
the indication is provided via at least one of a redundancy version or a scrambling sequence of the PBCH transmissions; and
different values of the first set of bits are mapped to different redundancy versions.

20. The method of claim 14, wherein the indication is provided via at least two of:
a synchronization signal, a master information block (MIB), a demodulation reference signals (DMRS), a scrambling sequence, or a mapping of different values of the first set of bits to different redundancy versions of the PBCH.

21. The method of claim 20, wherein when the indication is provided via the DMRS and the scrambling sequence, both the DMRS and the scrambling sequence carry a portion of a synchronization signal block (SSB) index.

22. The method of claim 20, wherein when the indication is provided via the DMRS and the scrambling sequence:
for a first set of PBCH TTIs, a design of the DMRS and scrambling sequence is the same for each PBCH TTI; and
for a second set of PBCH TTIs, the design of the DMRS and scrambling sequence is PBCH TTI-dependent.

23. The method of claim 20, wherein when the indication is provided via the DMRS and the MIB, the DMRS and the MIB both carry a portion of an indication of a half-frame.

24. The method of claim 14, further comprising obtaining information about the PBCH periodicity and/or TTI duration from another wireless device.

25. The method of claim 24, wherein the information is obtained via at least one of a master information block (MIB), system information block (SIB), or radio resource control (RRC) signaling.

26. The method of claim 24, wherein:
the information is obtained from a first base station; and
the PBCH is transmitted by a second base station.

27. The method of claim 24, wherein:
the information is obtained via a first radio access technology (RAT) network; and
the PBCH is transmitted via a second RAT network.

28. The method of claim 14, further comprising:
at least partially inferring information about the periodicity of the PBCH TTI through the detection of multiple instances of demodulation reference signals (DMRS); and
using the inferred information for subsequent PBCH processing.

29. An apparatus for wireless communications by a base station, comprising:
means for determining, based on a physical broadcast channel (PBCH) transmission periodicity and a duration of a PBCH transmission time interval (TTI), a first set of one or more bits of a timing reference number conveyed in the PBCH that change over a duration of the TTI, wherein a location of the first set of one or more bits within the timing reference number is different for different durations of the PBCH TTI;
means for transmitting multiple versions of a physical broadcast channel (PBCH) within the TTI, including a second set of bits of the timing reference number that do not change over the duration of the TTI; and
means for providing an indication, with each PBCH transmission, of the first set of bits of the timing reference number.

30. An apparatus for wireless communications by a wireless device, comprising:
means for determining, based on a physical broadcast channel (PBCH) transmission periodicity and a duration of a PBCH transmission time interval (TTI), a first set of one or more bits of a timing reference that change over a duration of the TTI, wherein a location of the first set of one or more bits within the timing reference number is different for different durations of the PBCH TTI;
means for decoding at least one of multiple versions of a physical broadcast channel (PBCH) within the TTI, wherein including a second set of bits of the timing reference number that do not change over the duration of the TTI; and
means for obtaining an indication, with each decoded PBCH transmission, of the first set of bits of the timing reference number.

31. An apparatus for wireless communications by a base station, comprising:
at least one processor coupled with a memory and configured to determine, based on a physical broadcast channel (PBCH) transmission periodicity and a duration of a PBCH transmission time interval (TTI), a first set of one or more bits of a timing reference number conveyed in the PBCH that change over a duration of the TTI, wherein a location of the first set of one or more bits within the timing reference number is different for different durations of the PBCH TTI; and
a transceiver configured to transmit multiple versions of a physical broadcast channel (PBCH) within the TTI, including a second set of bits of the timing reference number that do not change over the duration of the TTI and to provide an indication, with each PBCH transmission, of the first set of bits of the timing reference number.

32. An apparatus for wireless communications by a wireless device, comprising:
at least one processor coupled with a memory and configured to determine, based on a physical broadcast channel (PBCH) transmission periodicity and a duration of a PBCH transmission time interval (TTI), a first set of one or more bits of a timing reference that change over a duration of the TTI, wherein a location of the first set of one or more bits within the timing reference number is different for different durations of the PBCH TTI; and a decoder configured to decode at least one of multiple versions of a physical broadcast channel (PBCH) within the TTI, wherein including a second set of bits of the timing reference number that do not change over the duration of the TTI and to obtain an indication, with each decoded PBCH transmission, of the first set of bits of the timing reference number.

* * * * *